United States Patent Office.

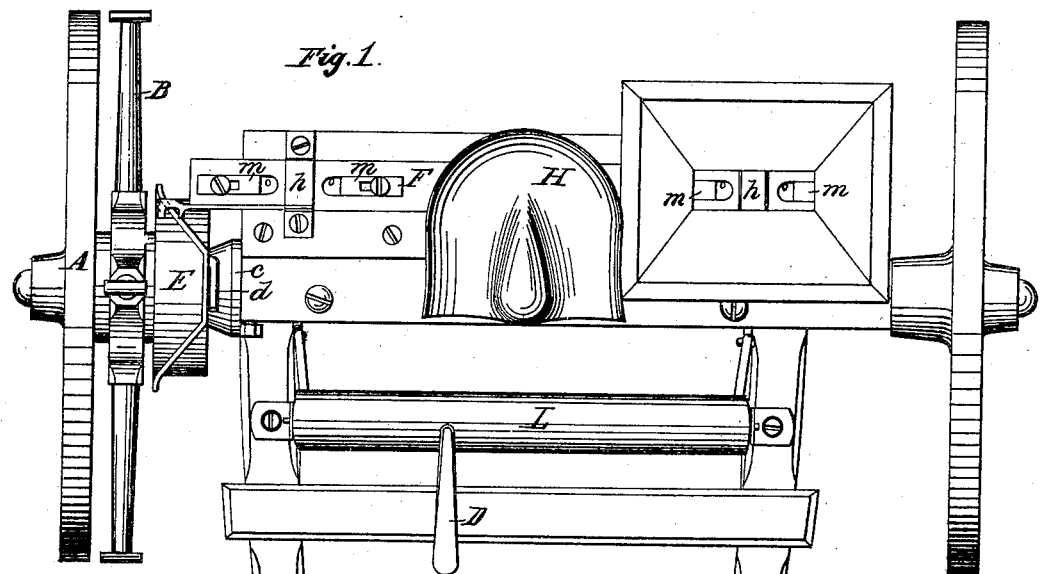

H. W. CAMP AND A. W. FOX, OF OWEGO, NEW YORK.

*Letters Patent No. 66,002, dated June 25, 1867.*

---

CORN-PLANTER.

---

*The Schedule referred to in these Letters Patent and making part of the same.*

---

TO ALL WHOM IT MAY CONCERN:

Be it known that we, H. W. CAMP and A. W. FOX, both of Owego, Tioga county, and State of New York, have invented a new and improved Machine for Planting Corn; and we do hereby declare that the following is a full and exact description thereof, reference being had to the accompanying drawings, and letters of reference marked thereon. In the accompanying drawings—

Figure 1 is a top view of the machine in elevation, with one hopper removed to show the seeding arrangement.

Figure 2 is a front elevation.

Figure 3 is a perspective of part of the feeding-bar and arrangement for dropping seed; and Figure 4 is a vertical longitudinal elevation of a drill-tooth, shoe, and roller for covering seed.

The nature of our invention consists in the employment of an axle, wheels, and thills or shafts, forming a cart, to be drawn by a horse.

The wheel A, which drives the seeding apparatus, has a hub, $b$, on its inner side. Fig. 2, hub in elevation to show the ratchet, the rest of the wheel in section, on which the index B and wheel E are fitted so as to turn easily, except when made to turn with the driving-wheel by means of the ratchet-teeth in the hub $b$ and pawl $d$. The index B has four arms which extend to the periphery of the wheel A, and which make a mark in the ground at the same time the seeding apparatus drops two hills of corn. The wheel E has a rib or flange raised on its periphery, and running entirely around it and crossing the face of the wheel angularly, four times, making four reverse inclines, which give motion to the feeding-bar F. Passing through the index B and wheel E is a rod, $d$, fig. 2, bent at one end, forming a pawl, which engages in the ratchet-teeth in the hub of the driving-wheel A, and the other end bent into a lever, which is actuated by a cone, $c$, surrounding the axle, and sliding upon it, being operated by the lever K. Attached to the feeding-bar F is a piece of iron, fig. 1, with a notch in the end, which hooks on the inclined flange on the wheel E, and as the wheel revolves the inclines move the feeding-bar alternately right and left, thus making a positive movement, and only moving it when corn is to be dropped. The feeding-bar is provided with four pockets, $o$, two pockets for each row to be planted, and has gauges $m$ to enlarge or contract these pockets, according to the amount of seed to be deposited. These gauges are strips of sheet metal, held in position by screws passing through slots, figs. 1 and 3. The ends of the strips are bent down at right angles into the pockets, and extend to the bottom. Each opening from the bottom of the hoppers is covered by a shield, $n$, which is made by forming two pieces of sheet metal, as shown in fig. 3, so that one piece is covered by the other, holding between them a single piece of rubber, leather, or other elastic substance, while the lips $f$ on the outer piece being turned downward turn the ends of the rubber or leahter down, the whole forming a simple and strong covering for the openings beneath, and for sweeping corn from the tops of the pockets as they pass under the shields. The hollow teeth $p$ are attached to bars hung under the thills or shafts in the ordinary manner, but these teeth are provided with shoes K, the forward parts of which are wedge-shape, to remove any loose stones or other obstructions which may lie in the path where a row of seed is to be planted. In the back parts of the shoes in rear of the teeth are hung concave-faced rollers, closely following the dropping seed, and effectually covering them up (the seed) as the machine passes along. The points of the teeth project below the shoes, which are held in place on the teeth by set-screws through ears on the tops of the shoes, and seed is planted at any depth desired by adjusting the shoes higher or lower on the teeth.

Having thus described the construction of our machine we will describe its operation.

In moving the machine when not planting, the driver in the seat H puts his foot on the lever D in the roller L, pressing it down, which raises the drill-teeth entirely from the ground, and, pulling the lever $k$, slides the cone $c$ under the arm of the rod $d$, thereby disengaging the pawl from the ratchet in the hub $b$, and the machine is driven along; but the index and seeding-wheel do not turn, and no seed are dropped although the hoppers may be full. On arriving where he wishes to commence planting, the driver removes his foot, and pushing the bar $k$ the cone is withdrawn, the pawl engages in the ratchet-teeth of the driving-wheel, and the machine is driven directly across the field. The index and seeding arrangement are operated, the index making a mark in the ground at the same time two hills of corn are planted, and directly in line with them. On crossing the field and turning round, the operator turns the index with his hand to correspond with the mark it made while planting the last rows, and this sets the seeding apparatus so that corn is planted in straight rows, so a cultivator can be run between in both directions.

What we claim as our invention, and desire to secure by Letters Patent, is—

1. The index B, when constructed, arranged, and applied to machines planting in rows for the purpose and as herein specified.

2. The wheel E, provided with a zigzag rim surrounding its periphery, in combination with the feeding-bar F, when constructed and operating substantially as herein described.

3. The shields $h$ and gauges $m$, in combination with the feeding-bar F, the whole constructed and operating substantially as herein specified.

4. The shoes K, for removing obstructions and regulating the depth seed are to be planted, in combination with the hollow teeth $p$, and roller P, when constructed in the manner herein set forth.

5. The ratchet-teeth, with pawl $d$ and cone $c$, in combination with the driving-wheel A, index B, and wheel E, when these several parts are arranged and operating substantially as herein specified.

H. W. CAMP.
A. W. FOX.

Witnesses:
 H. H. CAMP,
 OSCAR FINCH.